(12) United States Patent
Hecht et al.

(10) Patent No.: US 12,442,844 B2
(45) Date of Patent: Oct. 14, 2025

(54) METHODS AND SYSTEMS OF POWER DETECTION

(71) Applicant: Molex, LLC, Lisle, IL (US)

(72) Inventors: Josef Hecht, Erlangen (DE); Joerg Meißner, Altdorf (CH); Daniel Jakob, Nuremberg (DE)

(73) Assignee: Molex, LLC

( * ) Notice: Subject to any disclaimer, the term of this patent is extended or adjusted under 35 U.S.C. 154(b) by 507 days.

(21) Appl. No.: 17/555,497

(22) Filed: Dec. 19, 2021

(65) Prior Publication Data

US 2022/0214385 A1 Jul. 7, 2022

Related U.S. Application Data

(60) Provisional application No. 63/133,438, filed on Jan. 4, 2021.

(51) Int. Cl.
*G01R 21/10* (2006.01)

(52) U.S. Cl.
CPC .................. *G01R 21/10* (2013.01)

(58) Field of Classification Search
CPC ........ G01R 21/10; G01R 21/00; G01R 22/06; G01R 19/003; G01R 19/02; G01R 19/10; G01R 19/16528; G01R 19/30; G01R 21/06; G01R 29/04; H04B 17/26; H04B 2001/0408; H04B 2001/0416; H04B 1/04
USPC .......................................................... 702/60
See application file for complete search history.

(56) References Cited

U.S. PATENT DOCUMENTS

| | | | |
|---|---|---|---|
| 6,160,449 A | 12/2000 | Klomsdorf et al. | |
| 7,151,759 B1* | 12/2006 | Ryan ................... | H03G 3/3078 370/335 |
| 8,548,401 B2 | 10/2013 | Sasaki et al. | |
| 2004/0198232 A1 | 10/2004 | Fu | |
| 2010/0029225 A1 | 2/2010 | Urushihara et al. | |
| 2014/0187182 A1 | 7/2014 | Yan et al. | |
| 2020/0259465 A1* | 8/2020 | Wu ......................... | H03F 3/245 |

FOREIGN PATENT DOCUMENTS

| | | |
|---|---|---|
| CN | 1288302 A | 3/2001 |
| CN | 217543235 U | 10/2022 |
| JP | 2001068940 A | 3/2001 |
| JP | 2012129893 A | 7/2012 |
| WO | 2004001990 A1 | 12/2003 |

OTHER PUBLICATIONS

Extended European Search Report received for EP Application No. 21218048.3, mailed on Jun. 2, 2022, 08 Pages.

* cited by examiner

*Primary Examiner* — Lee E Rodak
*Assistant Examiner* — Byung Ro Lee

(57) ABSTRACT

Exemplary embodiments are disclosed of methods and systems of power detection in RF circuits to provide gain compensation for vehicle systems. In exemplary embodiments, a module (e.g., a front end module (FEM), compensor, compensator, etc.) includes a gain modifier, a power detector, and a controller. The power detector is configured to detect a power output of the gain modifier. The controller is configured to determine a mean of n samples taken by the power detector. The controller is also configured to determine a boundary to mean ratio of the n samples. The controller is further configured to adjust a detected value of the power detector based on the mean and the boundary to mean ratio.

25 Claims, 5 Drawing Sheets

METHODS AND SYSTEMS OF POWER DETECTION

RELATED APPLICATIONS

This application claims priority to and the benefit of U.S. Provisional Application No. 63/133,438 filed Jan. 4, 2021. The entire disclosure of the above application is incorporated herein by reference.

TECHNICAL FIELD

This disclosure generally relates to the field of power detection, and more specifically (but not exclusively) to the field of power detection in RF circuits intended to provide gain compensation for vehicle systems.

BACKGROUND ART

In a modern vehicle, it can be expected that RF signals will be sent and/or received from the vehicle. Whether it is an operator's and/or passenger's personal mobile device or a system in the vehicle that is intended to communicate with the outside world, one can expect that the signals will need to be emitted and/or received. As can be appreciated, however, the design of a vehicle is poorly suited to transmit RF signals as the substantial use of metal acts to attenuate the signal substantially.

To address the attenuation issue, vehicles can include antennas on their exterior and connect the antenna to a transceiver within the vehicle. The connection between the antenna and the transceiver, which is often provided by a cable because of the difficulty in placing the transceiver directly next to the antenna, allows for a relatively reliable and stable link but unfortunately the link also introduces attenuation. As a result, the power level provided the transceiver is not the same as the power level of the signal emitting from the antenna. The potential variance is further exacerbated by temperature variations (as changes in temperature impact the attenuation of the link).

To account for the attenuation in the link, a compensor or compensator can be provided. Compensors are typically placed close to the antenna and act by adjusting the gain of the signal so that the signal being emitted from the antenna more closely matches the signal the transceiver intended to send. In simple compensor systems, there is an initial calibration step and then the system uses temperature look-up tables to determine how to vary the gain provided by the compensor without further feedback control because a substantial portion of the variation in such RF systems is related to changes in temperature. In more complex systems, a feedback loop or feedforward loop is provided to regularly monitor the signal output and ensure it matches the desired output level. One issue that has arisen from both simple and complex systems, however, is that measuring the power level is not as simple as one might desire. The most straightforward way to measure power level is through the use of a diode detector. Such detectors typically use rectification to convert the RF signal into a DC signal and thus provide a voltage that can be used to determine the RF power. This turns out to provide less than the desired accuracy as variations in the modulation of the signal impact the detected voltage. An alternative that would be substantially more accurate would be to include a true RMS detector circuit but such circuits add substantial cost to a system and thus are less desirable for high-volume systems where cost is a significant factor. As a result, certain individuals would appreciate further improvements in RF power level detection.

SUMMARY

This section provides a general summary of the disclosure, and is not a comprehensive disclosure of its full scope or all of its features.

Exemplary embodiments are disclosed of methods and systems of power detection in RF circuits to provide gain compensation for vehicle systems. In exemplary embodiments, a module (e.g., a front end module (FEM), compensor, compensator, etc.) includes a gain modifier, a power detector, and a controller. The power detector is configured to detect a power output of the gain modifier. The controller is configured to determine a mean of n samples taken by the power detector. The controller is also configured to determine a boundary to mean ratio of the n samples. The controller is further configured to adjust a detected value of the power detector based on the mean and the boundary to mean ratio.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present application is illustrated by way of example and not limited in the accompanying figures in which like reference numerals indicate similar elements and in which.

DETAILED DESCRIPTION OF THE PREFERRED EMBODIMENTS

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

In a V2X compensator with and without variable gain control, it is necessary to precisely determine the output power. But as recognized herein, this can be problematic with available power detectors for the variety of RF signals considering the different modulation schemes and resource block allocations for the two different standards for V2X communications, specifically 802.11p(pWlan/DSRC) and C-V2X(LTE). Depending on the signal characteristics, the calculated power of the power detector is different than the real RMS value of the signal.

To achieve the required output power precision, it is necessary to measure the output power at the V2X compensator. But as explained above, diode detectors provide less than the desired accuracy as variations in the modulation of the signal impact the detected voltage. And while true RMS detector circuits would provide a substantially more accurate alternative to diode detectors, true RMS detector circuits add substantial cost to a system and thus less desirable for high-volume systems where cost is a significant factor.

After recognizing the above, exemplary embodiments of methods and systems were developed and/or are disclosed herein that are capable of precisely determining the output power with the usage of the existing power detector. As disclosed herein, a control unit of a compensator may be configured to sample the data from a power detector (e.g., diode detector, etc.). This also delivers a detector mean value and a maximum/minimum envelope value(s), which are dependent on the characteristics of the various modulated signals. The detector mean value and the minimum and/or maximum value of the signals envelope are used to determine the real RMS value of the RF power. Accordingly, the output power measured with the power detector may be determined precisely as necessary to control the gain of the compensator and to secure further RF standard compliance.

Figure 1A:
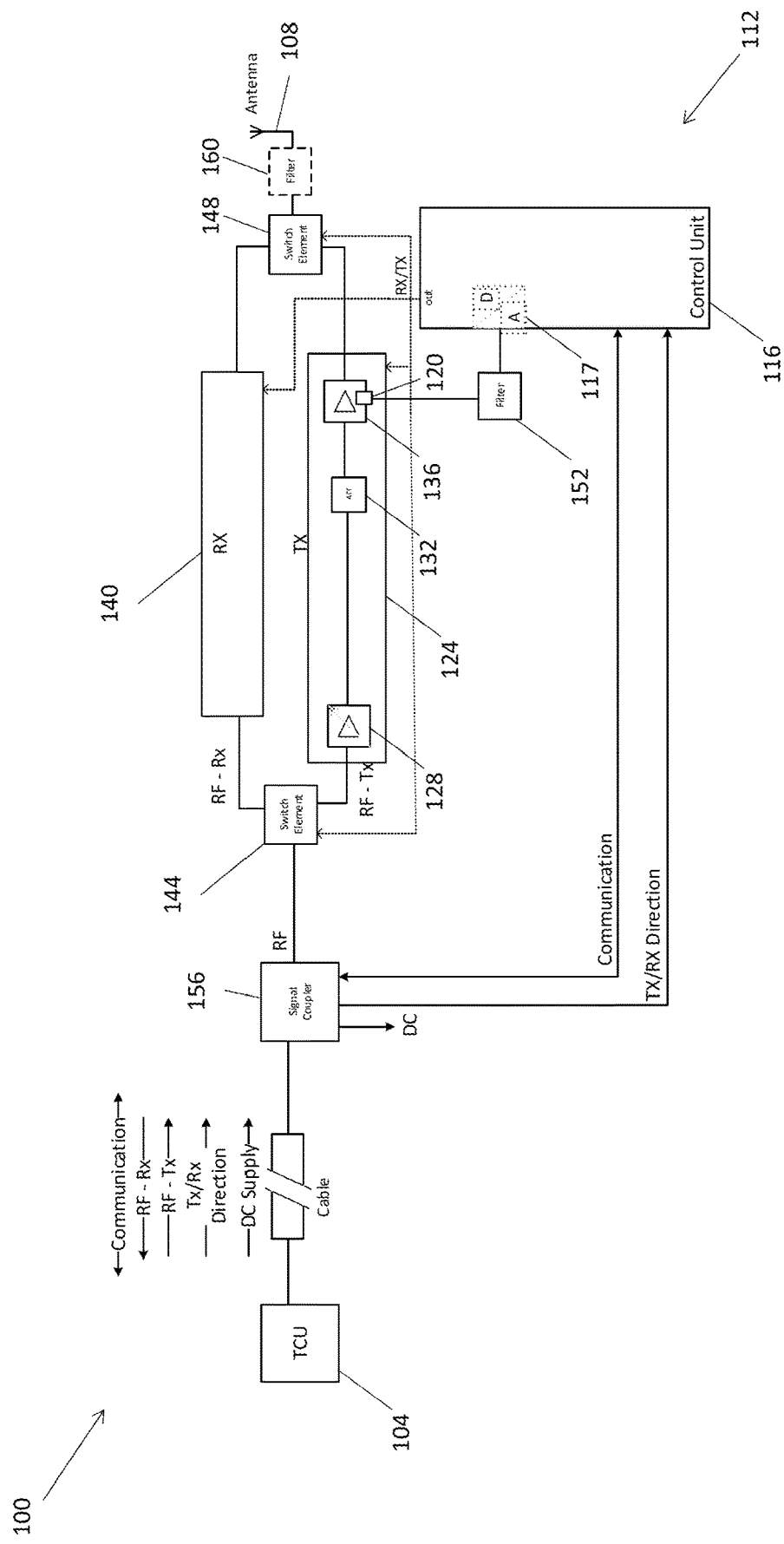
FIGS. 1A and 1B are block diagrams of example vehicular communication systems each including a gain modifier, a power detector, and a controller according to exemplary embodiments of the present disclosure.
Figure 1B:
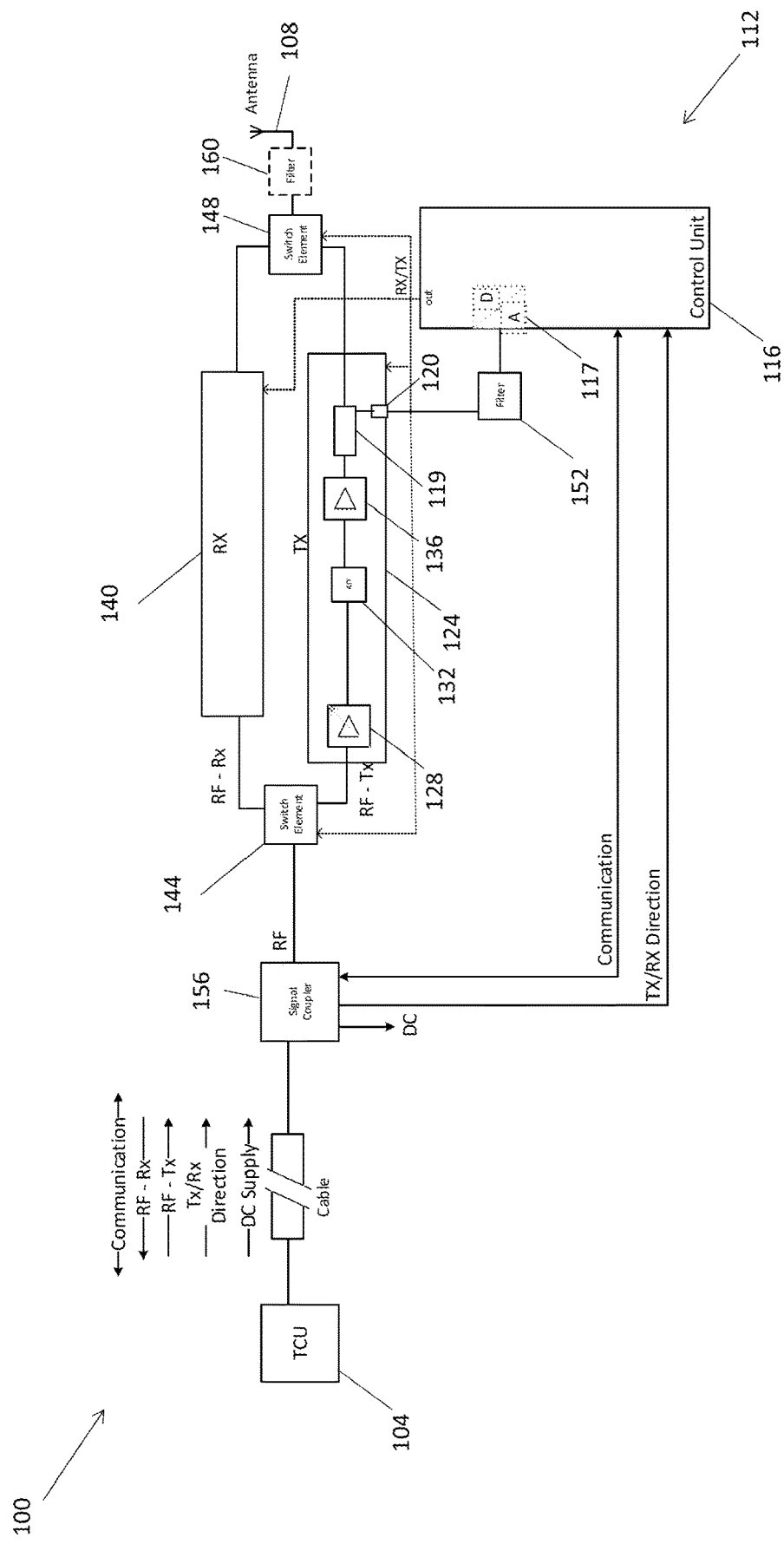

FIGS. 1A and 1B illustrate example vehicular communication systems 100 each including a telematics control unit (TCU) 104, an antenna 108, and a V2X compensator, compensor, or module 112 according to an exemplary embodiment. The system 100 shown in FIG. 1A is substantially identical to the system 100 shown in FIG. 1B except for the configuration of the power detector 120 (e.g., diode detector, etc.). More specifically, FIG. 1A shows the power detector 120 within an amplifier 136 of a gain modifier 124, whereas FIG. 1B shows a signal coupler 119 between the amplifier 136 and the power detector 120 within the gain modifier 124. Other than the different implementation of the power detector 120, the systems 100 shown in FIGS. 1A and 1B are essentially identical and therefore will be described together for brevity.

The V2X compensator 112 is disposed generally between the TCU 104 and the antenna 108. The V2X compensator 112 includes a control unit 116 (e.g., a microcontroller (MCU), etc.) that is configured for sampling the data from a power detector 120 (e.g., a passive diode detector, other simplified or primitive detectors, etc.). The control unit 116 includes an analog-digital-converter (ADC) 117 from which sampling points are obtained to do the calculations as disclosed herein. The sampled power detector signal may be used for determining a mean value and maximum/minimum envelope values. These values may be evaluated and used to determine a real RMS value of the RF power, to thereby improve RMS output power level accuracy of the power detector 120.

The V2X compensator 112 may be placed relatively close to the antenna 108. A gain modifier 124 of the V2X compensator 112 may be configured to be operable for adjusting the gain of the signal so that the signal being emitted from the antenna 108 more closely matches the signal the transceiver intended to send.

The gain modifier 124 includes a variable gain amplifier 128, an attenuator 132, an amplifier 136 along the Tx (transmit) path between first and second switch elements 144, 148. The power detector 120 is located within the amplifier 136 in the exemplary embodiment shown in FIG. 1A. But for the exemplary embodiment shown in FIG. 1B, the gain modifier 124 further includes a signal coupler 119 between the amplifier 136 and the power detector 120, such that the power detector 120 is not located inside the amplifier 136.

The variable gain amplifier 128, attenuator 132, and amplifier 136 are in series such that the attenuator 132 may be operable to attenuate signals received from the variable gain amplifier 128, which attenuated signals may thereafter be sent from the attenuator 132 to the amplifier 136 for amplification. The attenuator 132 may be a variable attenuator, a step attenuator, or a fixed attenuator. The attenuator 132 may be controlled by voltage, current, digital signals, etc.

The first and second switch elements 144, 148 may comprise RF switches to selectively activate the transmit path (Tx-path) or the receive path (Rx-path).

In other exemplary embodiments, the gain modifier 124 may include less components, more components, and/or different components than shown in FIGS. 1A and 1B. For example, the gain modifier 124 may include one or more (but not necessarily all) of the variable gain amplifier 128, the attenuator 132, the amplifier 136, or combination thereof in alternative embodiments. A gain modifier 124 may also or alternatively be provided along the Rx (receive) path 140 between first and second switch elements 144, 148. Another alternative position for the gain modifier 124 is between the signal coupled 156 and the first switch element 144.

A filter 152 is between the control unit 116 and the power detector 120. A signal coupler 156 is between the TCU 104 and the first switch element 144. A filter 160 is between the second switch element 148 and the antenna 108. The signal coupler 156, for example, may be a simple PCB trace RF coupler, a chip based directional coupler, or a bi-directional coupler, etc.

In exemplary embodiments, various components shown in FIGS. 1A and 1B may be entirely integrated or included in a single integrated assembly or module. For example, the V2X compensator 112, control unit 116, power detector 120, gain modifier 124, variable gain amplifier 128, attenuator 132, amplifier 136, second switch elements 144, 148, filters 152, 160, and signal coupler 156 may be entirely integrated or included in a single integrated assembly or module. The antenna 108 (e.g., a V2X antenna configured to be operable with Dedicated Short-Range Communication (DSRC) signals and/or C-V2X signals, etc.) may also be integrated or included with the antenna assembly or module.

In exemplary embodiments, the control unit 116 shown in FIGS. 1A and 1B is configured to determine a mean of n samples taken by the power detector 120. The control unit 116 is also configured to determine a boundary to mean ratio of the n samples. The control unit 116 is further configured to adjust a detected value of the power detector 120 based on the mean and the boundary to mean ratio. As explained below, the control unit 116 is configured to determine a real RMS value of the RF power ($P_{detRMS}$) via the formulas below and thereafter adjust the detected value of the power detector 120 by the determined compensation value ($P_{detRMS}$).

Sampled Power Detector Signal: SampledSignal=$V_1$, $V_2, \ldots, V_n$

Maximum Peak of the Sampled Signal: maxPeak=max(SampledSignal)

Minimum Peak of the Sampled Signal: minPeak=min (SampledSignal)

MEAN calculation may be either arithmetic mean or square root mean. The later formulas use the term MEAN with the understanding that the term MEAN may be either the arithmetic MEAN or square root MEAN.

arithmetic MEAN=$(\Sigma_{k=1}^{n} V_k)/n$ square root MEAN=$\sqrt{(\Sigma_{k=1}^{n} V_k^2)/n}$ Peak-to-Average Ratio may be determined using the minimum peak of the sampled signal (minPeak) or using the maximum peak of the sampled signal (maxPeak). The later formulas use the term xPAR with the understanding that xPAR may be either maxPAR or minPAR. By way of example, minimum peak-to-average ratio (minPAR) may preferably be used for high output power levels due to the compression of the power amplifier (PA).

maxPAR=maxPeak−MEAN minPAR=MEAN−minPeak

In an exemplary embodiment, compensation RMS value ($P_{detRMS}$) is determined using the formula below:

$P_{detRMS}$=MEAN+$X$(xPAR,MEAN)

in which X refers to a value from a Compensation Look-Up Table that corresponds with the boundary to mean ratio (xPAR) and the mean (MEAN). In an alternative embodiment, X refers to a value determined by a function that correlates the boundary to mean ratio (xPAR) and the mean (MEAN).

In another exemplary embodiment, compensation RMS value ($P_{detRMS}$) is determined using the formula:

$P_{detRMS}$=$(\Sigma_{k=1}^{n} V_k)/n$−$A$(xPAR,MEAN)

in which $V_k$ refers to the sampled power detector signal, and A refers to a value determined by a function that correlates the boundary to mean ratio (xPAR) and the mean (MEAN) or from a Compensation Look-Up Table that corresponds with the boundary to mean ratio (xPAR) and the mean (MEAN).

In a further exemplary embodiment, compensation RMS value ($P_{detRMS}$) is determined using the formula below:

$P_{detRMS}$=$\sqrt{(\Sigma_{k=1}^{n} V_k^2)/n - B(xPAR,MEAN)}$ in which $V_k$ refers to the sampled power detector signal, and B refers to a value determined by a function that correlates the boundary to mean ratio (xPAR) and the mean (MEAN) or from a Compensation Look-Up Table that corresponds with the boundary to mean ratio (xPAR) and the mean (MEAN).

After determining the compensation RMS value ($P_{detRMS}$) as disclosed above, the control unit 116 is configured to adjust the detected value of the power detector 120 (e.g., diode detector, etc.) by the compensation RMS value ($P_{detRMS}$). This, in turn, allows for improved RMS output power level accuracy of the power detector 120 and/or provides a more precise determination of the output power necessary to control the gain of the compensor/compensator 112.

Figure 2:
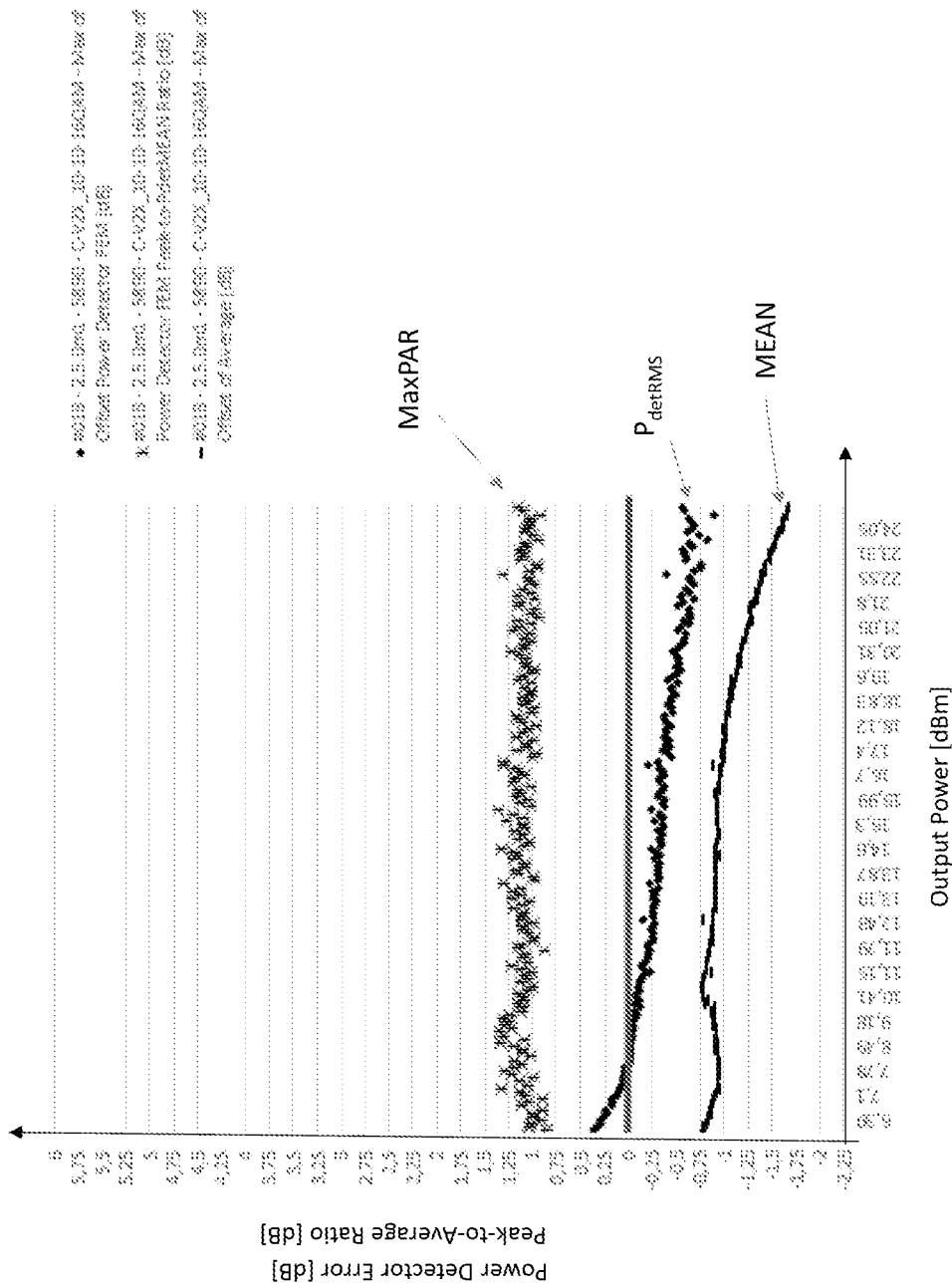
FIG. 2 is a line graph of arithmetic MEAN of sampled power detector signals, maximum peak-to-average ratio (maxPAR), and compensation RMS ($P_{detRMS}$) over measured output power (50 resource blocks with 16 QAM (Quadrature Amplitude Modulation)).

FIG. 2 is a line graph generally showing RMS accuracy over measured output power (50 resource blocks with 16 QAM (Quadrature Amplitude Modulation)). FIG. 2 shows arithmetic MEAN of sampled power detector signals, maximum peak-to-average ratio (maxPAR), and compensation RMS ($P_{detRMS}$). In this example, compensation RMS ($P_{detRMS}$) was determined by the formula:

$P_{detRMS}$=arithmetic MEAN+$X$(maxPAR,arithmetic MEAN)

in which X refers to a value from a Compensation Look-Up Table implementation that corresponds with the maxPAR and the arithmetic MEAN.

Figure 3:
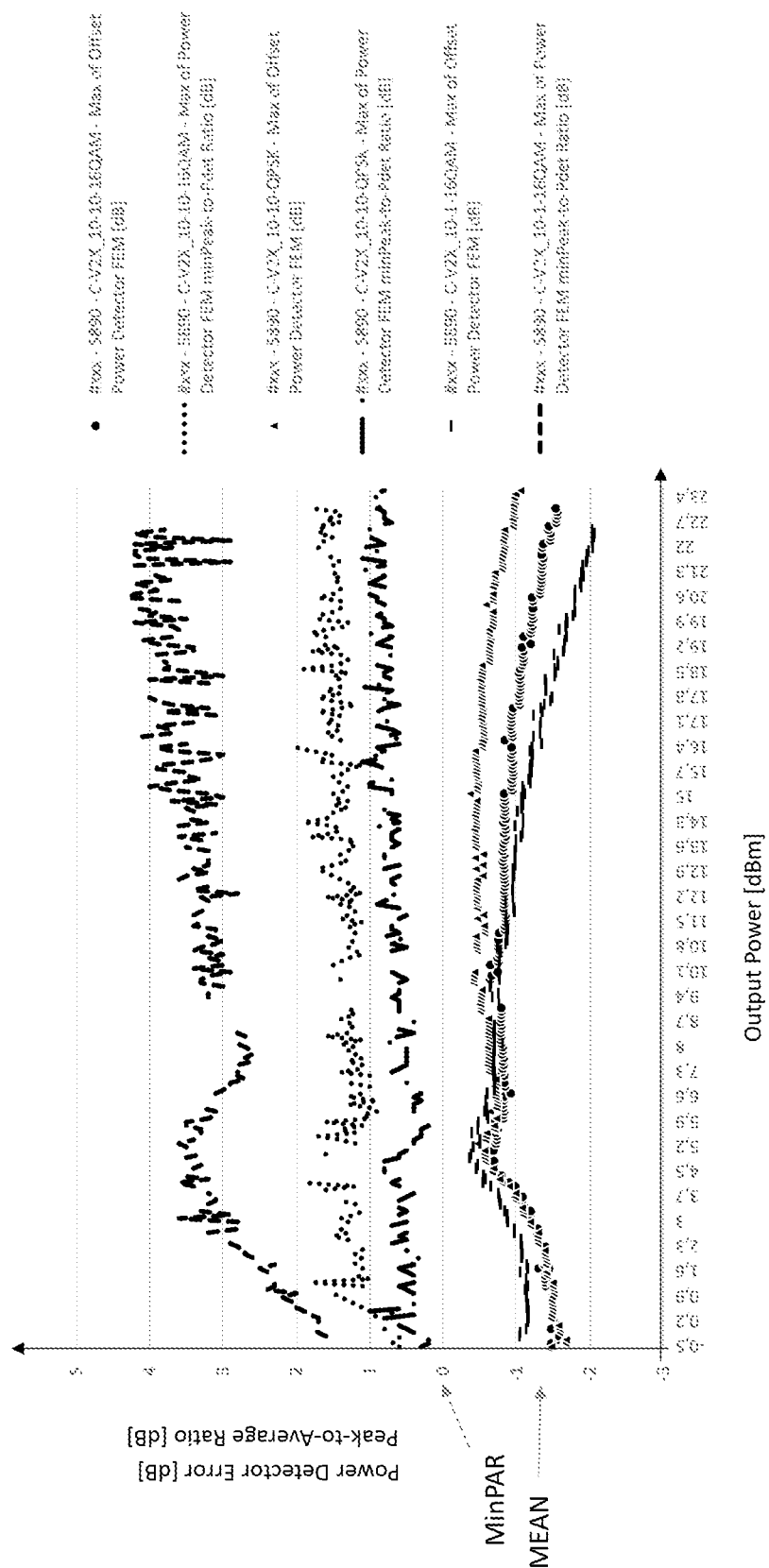
FIG. 3 is a line graph of minimum peak-to-average ratio (minPAR) and arithmetic over measured output power for three signals with different modulation schemes (QSPK (Quadrature Phase Shift Keying) modulation and 16 QAM (Quadrature Amplitude Modulation) modulation) and resource block allocations.

FIG. 3 is a line graph generally showing RMS accuracy over measured output power for three signals with different modulation schemes and resource block allocations. FIG. 3 shows minimum peak-to-average ratio (minPAR) values on the top and arithmetic MEAN on the bottom with high spread depending on modulation schemes and resource block allocations. Generally, the resultant MEAN detected by the diode detector shows the offset between the real power output level and the detected power output level. There is a substantial difference in the error between QSPK (Quadrature Phase Shift Keying) modulation and 16 QAM (Quadrature Amplitude Modulation) modulation. The differences in detected power based on modulation may occur because simplified or primitive detectors (e.g., passive diode detectors, etc.) are not able to follow the fast-changing signal shape of these modulations. It is also impossible to determine modulation in advance because it is unknown as to how much bandwidth and/or how many resource blocks are going to be allocated to a particular signal as the allocation depends on external factors.

Figure 4:
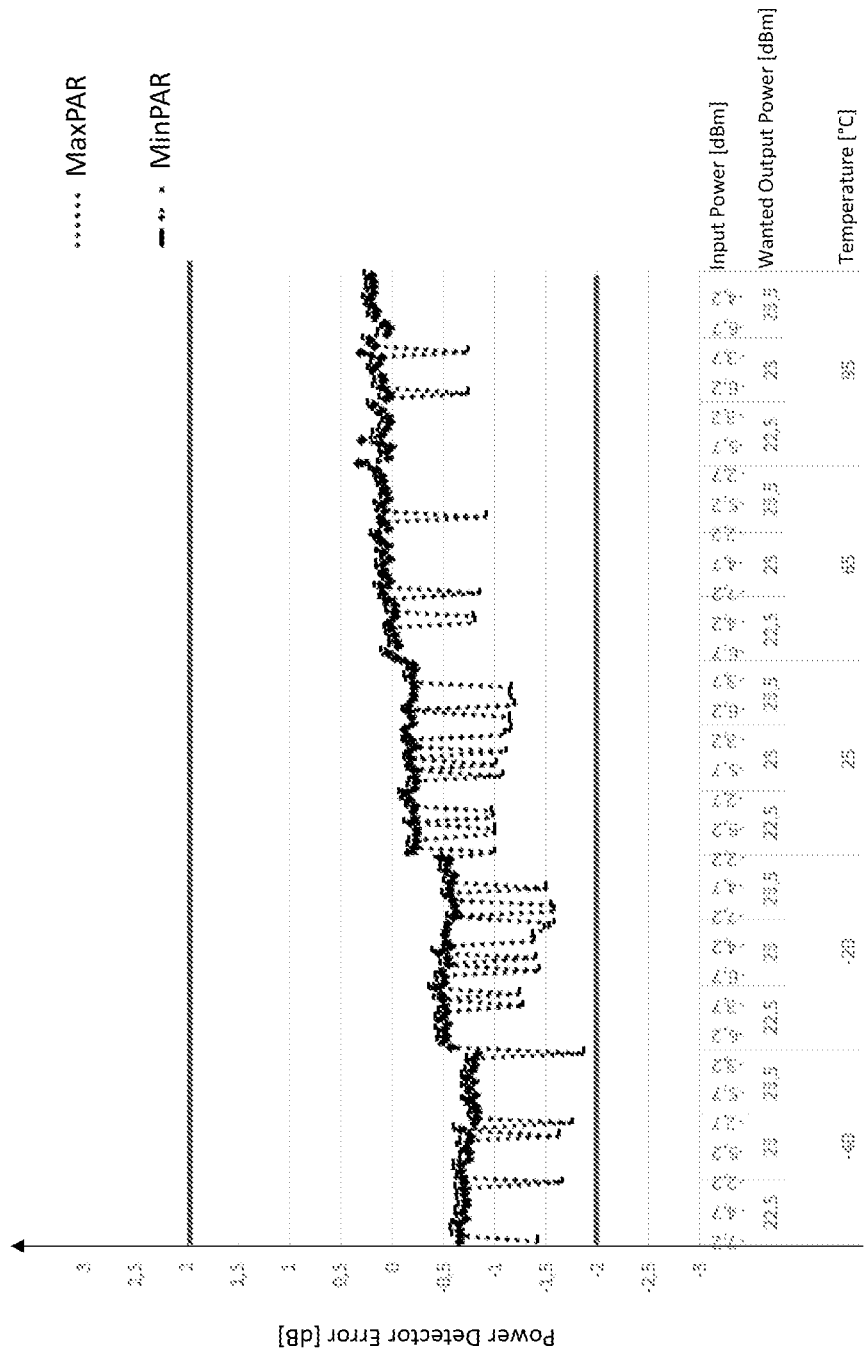
FIG. 4 is a line graph of maximum peak-to-average ratio (maxPAR) and minimum peak-to-average ratio (minPAR) of power detector error in decibels (dB) at different input power in decibels-milliwatts (dBm), wanted output power (dBm), and temperatures in degrees Celsius (° C.).

FIG. 4 is a line graph of maximum peak-to-average ratio (maxPAR) and minimum peak-to-average ratio (minPAR) of power detector error in decibels (dB) at different input power in decibels-milliwatts (dBm), wanted output power (dBm), and temperatures in degrees Celsius (° C.). Generally, FIG. 4 shows the advantage of the minPAR compared to the maxPAR on high output power levels. When high output power levels appear, it could be that the maximum value is affected by the compression/saturation of the power amplifier (clipping), which is what is shown by the dips of maxPAR in FIG. 4. But when the minimum value is used for high output power levels, the "clipping" effect with the compression of the power amplifier may be avoided, which is what is shown by the absence of dips of minPAR in FIG. 4. For low input power levels, the opposite may occur such that it would be preferable to use maxPAR because it is limited due to the noise and/or the dynamic range of the detector.

In exemplary embodiments, a module comprises a gain modifier, a power detector configured to detect a power output of the gain modifier, and a controller. The controller is configured to determine a mean of n samples taken by the power detector. The controller is further configured to determine a boundary to mean ratio of the n samples. The controller is configured to adjust a detected value of the power detector based on the mean and the boundary to mean ratio. The mean may be an arithmetic mean or a square root mean. The boundary may be a minimum or a maximum.

In an exemplary embodiment, the boundary to mean ratio (xPAR) is a maximum peak-to-average ratio (maxPAR). And, the controller is configured to determine the maximum peak-to-average ratio by subtracting the mean from a maximum peak of the n samples taken by the power detector.

In an exemplary embodiment, the boundary to mean ratio (xPAR) is a minimum peak-to-average ratio (minPAR). And, the controller is configured to determine the minimum peak-to-average ratio by subtracting a minimum peak of the n samples taken by the power detector from the mean.

In an exemplary embodiment, the boundary is a maximum peak of the n samples taken by the power detector. And, the controller is configured to determine the boundary to mean ratio (xPAR) by subtracting the mean from the maximum peak.

In an exemplary embodiment, the boundary is a minimum peak of the n samples taken by the power detector. And, the controller is configured to determine the boundary to mean ratio (xPAR) by subtracting the minimum peak from the mean.

In an exemplary embodiment, the controller is configured to determine compensation ($P_{detRMS}$) for the power detector by:

$$P_{detRMS} = MEAN + X(xPAR, MEAN)$$

X refers to a value from a Compensation Look-Up Table that corresponds with the boundary to mean ratio (xPAR) and the mean (MEAN).

In an exemplary embodiment, the controller is configured to determine compensation ($P_{detRMS}$) for the power detector by:

$$P_{detRMS} = MEAN + X(xPAR, MEAN)$$

X refers to a value determined by a function that correlates the boundary to mean ratio (xPAR) and the mean (MEAN).

In an exemplary embodiment, the controller is configured to determine compensation ($P_{detRMS}$) for the power detector by:

$$P_{detRMS} = (\Sigma_{k=1}^{n} V_k)/n - A(xPAR, MEAN)$$

$V_k$ refers to the sampled power detector signal; and
A refers to a value determined by a function that correlates the boundary to mean ratio (xPAR) and the mean (MEAN) or from a Compensation Look-Up Table that corresponds with the boundary to mean ratio (xPAR) and the mean (MEAN).

In an exemplary embodiment, the controller is configured to determine compensation ($P_{detRMS}$) for the power detector by:

$$P_{detRMS} = \sqrt{(\Sigma_{k=1}^{n} V_k^2)/n - B(xPAR, MEAN)}$$

$V_k$ refers to the sampled power detector signal; and
B refers to a value determined by a function that correlates the boundary to mean ratio (xPAR) and the mean (MEAN) or from a Compensation Look-Up Table that corresponds with the boundary to mean ratio (xPAR) and the mean (MEAN).

In an exemplary embodiment, the controller is configured to adjust the detected value of the power detector by the compensation ($P_{detRMS}$). And, the adjustment to the detected value of the power detector by the compensation ($P_{detRMS}$) may improve RMS output power level accuracy of the power detector.

In an exemplary embodiment, the module is configured to support both the DSRC/802.11p standard and the c-V2X LTE standard for V2X.

In an exemplary embodiment, the module is configured for use with at least one modulated signal having a nonconstant signal envelope.

In an exemplary embodiment, the module is configured for use with at least one modulated signal having a nonconstant signal envelope including one or more of Dedicated Short-Range Communication (DSRC) signals, C-V2X signals, 5G new radio signals, and/or WLAN signals.

In an exemplary embodiment, the power detector comprises a diode detector.

In an exemplary embodiment, the gain modifier comprises a variable gain amplifier, an attenuator, and an amplifier in series.

In an exemplary embodiment, the module is a V2X front end module (FEM).

In an exemplary embodiment, a V2X compensator comprises a module as disclosed herein.

In an exemplary embodiment, a vehicular V2X communication system includes a telecommunication control unit (TCU), at least one antenna configured to be operable with Dedicated Short-Range Communication (DSRC) signals and/or C-V2X signals, and a module as disclosed herein.

In an exemplary embodiment, a vehicular communication system includes a telecommunication control unit (TCU), at least one antenna configured to be operable with at least one modulated signal having a nonconstant signal envelope, and a module as disclosed herein. The at least one modulated signal having the nonconstant signal envelope may comprise Dedicated Short-Range Communication (DSRC) signals, C-V2X signals, 5G new radio signals, and/or WLAN signals.

In exemplary embodiments, a method comprises determining a mean of n power detector signal samples taken by a power detector; determining a boundary to mean ratio of the n power detector signal samples; and adjusting a detected value of the power detector based on the mean and the boundary to mean ratio. The mean may be an arithmetic mean or a square root mean. The boundary may be a minimum or a maximum.

In an exemplary embodiment, the method includes determining a maximum peak of the n power detector signal samples. And, determining the boundary to mean ratio (xPAR) of the n power detector signal samples includes subtracting the mean from the maximum peak.

In an exemplary embodiment, the method includes determining a minimum peak of the n power detector signal samples. And, determining the boundary to mean ratio (xPAR) of the n power detector signal samples includes subtracting the minimum peak from the mean.

In an exemplary embodiment, the method includes determining compensation ($P_{detRMS}$) for the power detector by:

$$P_{detRMS} = MEAN + X(xPAR, MEAN)$$

X refers to a value from a Compensation Look-Up Table that corresponds with the boundary to mean ratio (xPAR) and the mean (MEAN).

In an exemplary embodiment, the method includes determining compensation ($P_{detRMS}$) for the power detector by:

$$P_{detRMS} = MEAN + X(xPAR, MEAN)$$

X refers to a value determined by a function that correlates the boundary to mean ratio (xPAR) and the mean (MEAN).

In an exemplary embodiment, the method includes determining compensation ($P_{detRMS}$) for the power detector by:

$$P_{detRMS} = (\Sigma_{k=1}^{n} V_k)/n - A(xPAR, MEAN)$$

$V_k$ refers to the power detector signal samples; and
A refers to a value determined by a function that correlates the boundary to mean ratio (xPAR) and the mean (MEAN) or from a Compensation Look-Up Table that corresponds with the boundary to mean ratio (xPAR) and the mean (MEAN).

In an exemplary embodiment, the method includes determining compensation ($P_{detRMS}$) for the power detector by:

$$P_{detRMS} = \sqrt{(\Sigma_{k=1}^{n} V_k^2)/n - B(xPAR, MEAN)}$$

$V_k$ refers to the power detector signal samples; and
B refers to a value determined by a function that correlates the boundary to mean ratio (xPAR) and the mean (MEAN) or from a Compensation Look-Up Table that corresponds with the boundary to mean ratio (xPAR) and the mean (MEAN).

In an exemplary embodiment, adjusting the detected value of the power detector based on the mean and the boundary to mean ratio comprises adjusting the detected value of the power detector by the compensation ($P_{detRMS}$). And, adjusting the detected value of the power detector by the compensation ($P_{detRMS}$) may improve RMS output power level accuracy of the power detector.

In an exemplary embodiment of the method, the power detector comprises a diode detector configured to detect a power output of a gain modifier of a V2X front end module (FEM).

In exemplary embodiments, a non-transitory computer-readable storage media comprises computer-executable instructions, that when executed by at least one processor, cause the at least one processor to be operable for: determining a mean of n power detector signal samples taken by a power detector; determining a boundary to mean ratio of the n power detector signal samples; and adjusting a detected value of the power detector based on the mean and the boundary to mean ratio. The mean may be an arithmetic mean or a square root mean. The boundary may be a minimum or a maximum.

In an exemplary embodiment, the computer-executable instructions, that when executed by the at least one processor, cause the at least one processor to be operable for: determining a maximum peak of the n power detector signal samples; and determining the boundary to mean ratio (xPAR) of the n power detector signal samples by subtracting the mean from the maximum peak.

In an exemplary embodiment, the computer-executable instructions, that when executed by the at least one processor, cause the at least one processor to be operable for: determining a minimum peak of the n power detector signal samples; and determining the boundary to mean ratio (xPAR) of the n power detector signal samples by subtracting the minimum peak from the mean.

In an exemplary embodiment, the computer-executable instructions, that when executed by the at least one processor, cause the at least one processor to be operable for determining compensation ($P_{detRMS}$) for the power detector by:

$$P_{detRMS} = MEAN + X(xPAR, MEAN)$$

X refers to a value from a Compensation Look-Up Table that corresponds with the boundary to mean ratio (xPAR) and the mean (MEAN).

In an exemplary embodiment, the computer-executable instructions, that when executed by the at least one processor, cause the at least one processor to be operable for determining compensation ($P_{detRMS}$) for the power detector by:

$$P_{detRMS} = MEAN + X(xPAR, MEAN)$$

X refers to a value determined by a function that correlates the boundary to mean ratio (xPAR) and the mean (MEAN).

In an exemplary embodiment, the computer-executable instructions, that when executed by the at least one processor, cause the at least one processor to be operable for determining compensation ($P_{detRMS}$) for the power detector by:

$$P_{detRMS} = (\Sigma_{k=1}^{n} V_k)/n - A(xPAR, MEAN)$$

$V_k$ refers to the power detector signal samples; and
A refers to a value determined by a function that correlates the boundary to mean ratio (xPAR) and the mean (MEAN) or from a Compensation Look-Up Table that corresponds with the boundary to mean ratio (xPAR) and the mean (MEAN).

In an exemplary embodiment, the computer-executable instructions, that when executed by the at least one processor, cause the at least one processor to be operable for determining compensation ($P_{detRMS}$) for the power detector by:

$$P_{detRMS} = \sqrt{(\Sigma_{k=1}^{n} V_k^2)/n} - B(xPAR, MEAN)$$

$V_k$ refers to the power detector signal samples; and
B refers to a value determined by a function that correlates the boundary to mean ratio (xPAR) and the mean (MEAN) or from a Compensation Look-Up Table that corresponds with the boundary to mean ratio (xPAR) and the mean (MEAN).

In an exemplary embodiment, the computer-executable instructions, that when executed by the at least one processor, cause the at least one processor to be operable for adjusting the detected value of the power detector by the compensation ($P_{detRMS}$).

In an exemplary embodiment, the computer-executable instructions, that when executed by the at least one processor, cause the at least one processor to be operable for improving RMS output power level accuracy of the power detector by adjusting the detected value of the power detector by the compensation ($P_{detRMS}$).

In an exemplary embodiment of the non-transitory computer-readable storage media, the power detector comprises a diode detector configured to detect a power output of a gain modifier of a V2X front end module (FEM).

The exemplary embodiments of the modules (e.g., front end module (FEM), compensor, compensator, etc.), systems (e.g., V2X (e.g., C-V2X and DSRC, etc.) communication system, etc.), and methods disclosed herein may be used with a wide range of platforms, including automobiles, buses, trains, motorcycles, boats, among other mobile platforms. Accordingly, the references to vehicles herein should not be construed as limiting the scope of the present disclosure to any specific type of platform. In addition, exemplary embodiments of the modules, systems, and methods disclosed herein should also not be limited to only the DSRC/802.11p standard and the c-V2X LTE standard for V2X as exemplary embodiments disclosed herein may be used with any modulated signals with nonconstant signal envelopes, such as 5G new radio, WLAN, etc.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A module comprising:
   a gain modifier;
   a power detector configured to detect a power output of the gain modifier; and a controller configured to:
   determine, from n samples from the power detector, a mean of the n samples taken by the power detector;
   determine, from the n samples from the power detector, a maximum peak of the n samples taken by the power detector;
   determine, from the n samples from the power detector, a minimum peak of the n samples taken by the power detector;
   determine, based on at least one characteristic of a modulated signal, a boundary to mean ratio of the n samples, wherein the boundary is determined using the maximum peak or the minimum peak, and the at least one characteristic of the modulated signal;

adjust a detected value of the power detector based on the mean and the boundary to mean ratio; and control gain of the gain modifier based on the adjusted detected value.

2. The module of claim 1, wherein the mean is one of an arithmetic mean or a square root mean.

3. The module of claim 1, wherein:
the boundary to mean ratio (xPAR) is a maximum peak-to-average ratio (maxPAR); and
the controller is configured to determine the maximum peak-to-average ratio by subtracting the mean from the maximum peak of the n samples taken by the power detector.

4. The module of claim 1, wherein:
the boundary to mean ratio (xPAR) is a minimum peak-to-average ratio (minPAR); and
the controller is configured to determine the minimum peak-to-average ratio by subtracting the minimum peak of the n samples taken by the power detector from the mean.

5. The module of claim 4, wherein the controller is configured to determine compensation (P<letRMs) for the power detector.

6. The module of claim 5, wherein the controller is configured to adjust the detected value of the power detector by compensation (PdetRMs).

7. The module of claim 6, wherein the adjustment to the detected value of the power detector by the compensation (PdetRMs) improves RMS output power level accuracy of the power detector.

8. The module of claim 1, wherein:
the boundary is the maximum peak of the n samples taken by the power detector; and
the controller is configured to determine the boundary to mean ratio (xPAR) by subtracting the mean from the maximum peak.

9. The module of claim 1, wherein:
the boundary is the minimum peak of the n samples taken by the power detector; and
the controller is configured to determine the boundary to mean ratio (xPAR) by subtracting the minimum peak from the mean.

10. The module of claim 1, wherein the boundary to mean ratio (xPAR) is selected from one of a maximum peak-to-average ratio (maxPAR) or minimum peak-to-average ratio (minPAR) and the controller is configured to determine compensation (P<letRMs) for the power detector by equation:

$$P\text{detRMs}=\text{MEAN}+X(\text{xPAR},\text{MEAN})$$

X refers to a value from a Compensation Look-Up Table that corresponds with the boundary to mean ratio (xPAR) and the mean (MEAN).

11. The module of claim 1, wherein the boundary to mean ratio (xPAR) is selected from one of a maximum peak-to-average ratio (maxPAR) or minimum peak-to-average ratio (minPAR) and the controller is configured to determine compensation (P<letRMs) for the power detector by equation:

$$P\text{detRMs}=\text{MEAN}+X(\text{xPAR},\text{MEAN})$$

where X refers to a value determined by a function that correlates the boundary to mean ratio (xPAR) and the mean (MEAN).

12. The module of claim 1, wherein the boundary to mean ratio (xPAR) is selected from one of a maximum peak-to-average ratio (maxPAR) or minimum peak-to-average ratio (minPAR) and the controller is configured to determine compensation (PdetRMS) for the power detector by equation:

$$P\text{detRMS}=(\Sigma_k^n=1 V_k)/n-(\text{xPAR},\text{MEN})$$

where $V_k$ refers to a sampled power detector signal of the n samples taken by the power detector; and
where A refers to a value determined by a function that correlates the boundary to mean ratio (xPAR) and the mean (MEAN) or from a Compensation Look-Up Table that corresponds with the boundary to mean ratio (xPAR) and the mean (MEAN).

13. The module of claim 1, wherein the boundary to mean ratio (xPAR) is selected from one of a maximum peak-to-average ratio (maxPAR) or minimum peak-to-average ratio (minPAR) and the controller is configured to determine compensation (PdetRMS) for the power detector by equation:

$$P\text{detRMS}=\sqrt{(\Sigma_k^n=1 V_k)/n-A(\text{xPAR},\text{MEN})}$$

where $V_k$ refers to a sampled power detector signal of the n samples taken by the power detector; and
where B refers to a value determined by a function that correlates the boundary to mean ratio (xPAR) and the mean (MEAN) or from a Compensation Look-Up Table that corresponds with the boundary to mean ratio (xPAR) and the mean (MEAN).

14. The module of claim 1, wherein the module is configured to support both DSRC/802.11p standard and c-V2X LTE standard for V2X.

15. The module of claim 1, wherein the module is configured for use with at least one modulated signal having a nonconstant signal envelope.

16. The module of claim 1, wherein the module is configured for use with at least one modulated signal having a nonconstant signal envelope including one or more of Dedicated Short-Range Communication (DSRC) signals, C-V2X signals, 5G new radio signals, and/or WLAN signals.

17. The module of claim 1, wherein the at least one characteristic of the modulated signal includes output power of the modulated signal.

18. A method comprising:
determining, from n power detector signal samples from a power detector, a mean of the n power detector signal samples taken by the power detector;
determining, from the n power detector signal samples from the power detector, a maximum peak of the n power detector signal samples taken by the power detector;
determining, from the n power detector signal samples from the power detector, a
minimum peak of the n power detector signal samples taken by the power detector;
determining, based on at least one characteristic of a modulated signal, a boundary to mean ratio of the n power detector signal samples, wherein the boundary is determined using the maximum peak or the minimum peak, and the at least one characteristic of the modulated signal;
adjusting a detected value of the power detector based on the mean and the boundary to mean ratio; and
controlling gain of a gain modifier to the power detector, based on the adjusted detected value.

19. The method of claim 18, wherein the mean is one of an arithmetic mean or a square root mean.

20. The method of claim 18, wherein:
determining the boundary to mean ratio (xPAR) of the n power detector signal samples includes subtracting the mean from the maximum peak.

21. The method of claim 18, wherein:
determining the boundary to mean ratio (xPAR) of the n power detector signal samples includes subtracting the minimum peak from the mean.

22. The method of claim 18, wherein the method includes determining compensation (PdetRMS) for the power detector.

23. The method of claim 22, wherein adjusting the detected value of the power detector based on the mean and the boundary to mean ratio comprises adjusting the detected value of the power detector by the compensation (PdetRMs).

24. The method of claim 22, wherein adjusting the detected value of the power detector by the compensation (P<letRMs) improves RMS output power level accuracy of the power detector.

25. The method of claim 18, wherein the power detector comprises a diode detector configured to detect a power output of a gain modifier of a V2X front end module (FEM).

* * * * *